(12) United States Patent
Tesch et al.

(10) Patent No.: US 7,243,940 B2
(45) Date of Patent: Jul. 17, 2007

(54) SIDE AIRBAG AND METHOD OF FOLDING

(75) Inventors: Todd E. Tesch, Tipp City, OH (US); Edward J. Matlack, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 318 days.

(21) Appl. No.: 10/718,453

(22) Filed: Nov. 20, 2003

(65) Prior Publication Data

US 2005/0110251 A1 May 26, 2005

(51) Int. Cl.
*B60R 21/20* (2006.01)

(52) U.S. Cl. .................... 280/728.1; 280/730.2
(58) Field of Classification Search ........... 280/730.2, 280/743.1; 493/449, 451, 457; 53/459

See application file for complete search history.

(56) References Cited

U.S. PATENT DOCUMENTS

| | | | | |
|---|---|---|---|---|
| 2,039,335 A | * | 5/1936 | Otto | 493/399 |
| 2,902,535 A | * | 9/1959 | Francis | 174/69 |
| 3,038,718 A | * | 6/1962 | Balsam | 270/40 |
| 5,493,846 A | * | 2/1996 | Baker et al. | 53/429 |
| 6,073,961 A | * | 6/2000 | Bailey et al. | 280/730.2 |
| 6,168,191 B1 | | 1/2001 | Webber et al. | 280/730.2 |
| 6,361,069 B1 | * | 3/2002 | Saito et al. | 280/730.2 |
| 6,371,512 B1 | * | 4/2002 | Asano et al. | 280/730.2 |
| 6,460,877 B2 | * | 10/2002 | Tanabe et al. | 280/729 |
| 6,520,533 B2 | * | 2/2003 | Tanase et al. | 280/730.2 |
| 6,619,690 B2 | * | 9/2003 | Tanase et al. | 280/730.2 |
| 6,644,687 B2 | * | 11/2003 | Saito et al. | 280/730.2 |
| 6,802,530 B2 | * | 10/2004 | Wipasuramonton et al. | 280/730.2 |
| 2001/0006287 A1 | * | 7/2001 | Tanase et al. | 280/730.2 |
| 2002/0089154 A1 | * | 7/2002 | Ogawa et al. | 280/730.2 |
| 2002/0096864 A1 | | 7/2002 | Asano et al. | |
| 2002/0175503 A1 | * | 11/2002 | Hess et al. | 280/730.2 |
| 2003/0038465 A1 | * | 2/2003 | Ford | 280/743.2 |
| 2003/0047920 A1 | * | 3/2003 | Tanase et al. | 280/730.2 |
| 2003/0146608 A1 | * | 8/2003 | Uchiyama et al. | 280/730.2 |
| 2003/0230878 A1 | * | 12/2003 | Inoue | 280/730.2 |

FOREIGN PATENT DOCUMENTS

| | | |
|---|---|---|
| EP | 0855315 | 7/1998 |
| EP | 1342629 | 9/2003 |

OTHER PUBLICATIONS

Search report for EP 04 07 8144.

* cited by examiner

*Primary Examiner*—Eric Culbreth
*Assistant Examiner*—Barry Gooden, Jr.
(74) *Attorney, Agent, or Firm*—Douglas D. Fekete

(57) ABSTRACT

A method and apparatus for providing a side airbag device for use in a vehicle, comprising: an inflatable cushion for deployment from an unexpanded state to an expanded state. The inflatable cushion is positioned behind a headliner of the vehicle in an un-inflated state and the inflatable cushion is configured to traverse a side of the vehicle when it is inflated. The inflatable cushion also comprising a deploying edge that defines a portion of a periphery of the inflated cushion, wherein the inflatable cushion is folded in a manner that causes the deploying edge to deploy as a first leading edge as said inflatable cushion is inflated to an expanded state by an inflator wherein the deploying edge is the first portion of the inflatable cushion to expand around the headliner.

11 Claims, 3 Drawing Sheets

SIDE AIRBAG AND METHOD OF FOLDING

TECHNICAL FIELD

The present application relates to side airbag devices and more particularly the present application relates to an apparatus and method for configuring the deployment characteristics of a side airbag device.

BACKGROUND

Vehicles are supplied with side airbag devices. Generally the device is located along a side of the vehicle and deploys an inflatable curtain in accordance with a predetermined activation occurrence. The side impact air bags are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

When the air bag or inflatable cushion is mounted to the vehicle the top edge portion is fixed and a lower edge portion which defines the bottom periphery of the airbag deploys out of the storage location positioned in close proximity to the roof rail. Accordingly, it is desirable to provide a folded side airbag wherein the lower edge portion is the first portion of the airbag to deploy out of its housing during an activation event.

SUMMARY OF THE INVENTION

This disclosure relates to a method and apparatus for providing a side airbag device having an inflatable cushion. The inflatable cushion is folded and positioned in such a manner that the portion of the inflatable cushion comprising the furthest point of deployment from a point of securement of the inflatable cushion to the vehicle is deployed around a deployable structure housing the un-inflated cushion first.

A method and apparatus for providing a side airbag device for use in a vehicle, comprising: an inflatable cushion for deployment from an unexpanded state to an expanded state. The inflatable cushion is positioned behind a headliner of the vehicle in an un-inflated state and the inflatable cushion is configured to traverse a side of the vehicle when it is inflated. The inflatable cushion also comprising a deploying edge that defines a portion of a periphery of the inflated cushion, wherein the inflatable cushion is folded in a manner that causes the deploying edge to deploy as a first leading edge as said inflatable cushion is inflated to an expanded state by an inflator wherein the deploying edge is the first portion of the inflatable cushion to expand around the headliner.

A method for folding an inflatable cushion of a side airbag device, comprising: providing a securement end of the inflatable cushion; creating a first fold at a first position away from the securement end, the first fold and the securement end defining one side of the folded inflatable cushion; positioning a traversing portion of the inflatable cushion away from the first fold, the traversing portion defining another side of the folded inflatable cushion; creating a plurality of folds from the traversing portion back towards the first fold; positioning an end portion of the inflatable cushion about the plurality of folds, the end portion defining another two sides of the folded inflatable cushion, wherein the end portion is the first portion of the inflatable cushion to deploy when the inflatable cushion is inflated.

A side airbag device for use in a vehicle having a forward end, a rearward end and a pair of sides disposed therebetween, comprising: an inflatable cushion for deployment from an unexpanded state to an expanded state, the inflatable cushion being configured to traverse a portion one of the pair of sides of the vehicle in the expanded state, the inflatable cushion comprising an inflation opening, a fixed portion and a deploying edge, the deploying edge comprising a majority of a periphery of the inflatable cushion; an inflator for inflating the inflatable cushion; wherein the inflatable cushion is folded in a manner that causes the deploying edge to deploy as a first leading edge as the inflatable cushion is inflated to the expanded state by the inflator.

DETAILED DESCRIPTION OF EXEMPLARY EMBODIMENTS

This disclosure relates to an airbag device wherein the inflatable cushion is stored in such a manner that the first portion to deploy from the storage location of the inflatable cushion is the lower leading edge of the same. More particularly, the inflatable cushion is folded in such a manner that the lower leading edge of the deployed cushion is deployed first from a storage location or housing area of the body inflated inflatable cushion.

Figure 1:
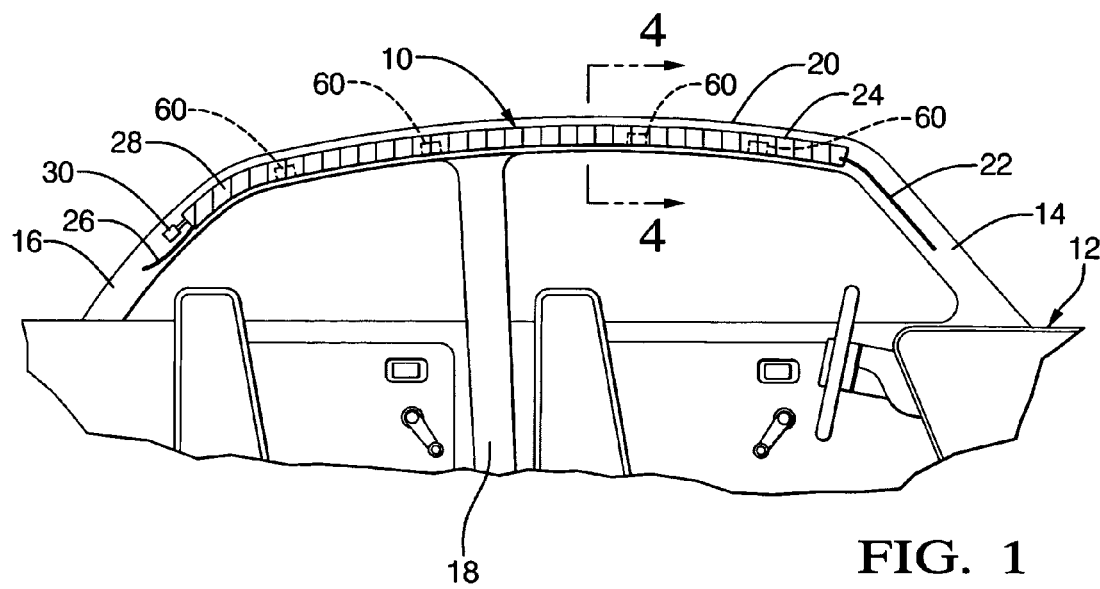
FIG. 1 is a side elevational view of an inflatable cushion of an exemplary embodiment of the present invention in a stored position.

Referring now to FIG. 1 an airbag 10 is illustrated. Airbag 10 is manufactured and constructed in accordance with exemplary embodiments of the present invention. FIG. 1 illustrates the airbag mounted to a vehicle 12 in a stored or non-deployed state. Vehicle 12 comprises a front pillar 14, a rear pillar 16 and if the vehicle has more than one door per side, a center pillar 18. Airbag 10 is stored and mounted to or proximate to the vehicle roof rail 20. In some applications a first tether or connecting means 22 connects a front portion 24 of the air bag to the front pillar and a second tether or connecting means 26 connects a rear portion 28 of the air bag to the rear pillar. If is of course, understood that depending on the application requirements or configuration of the airbag device, airbag 10 may or may not require connecting means 22 and 26. Thus, the connecting means 22 and 26 are provided as examples and the present invention is not intended to be limited by the same.

As illustrated, the rear portion of the air bag is in fluid communication with a gas generator or inflator 30 positioned to provide an inflation gas to inflate airbag 10. It is, of course, understood and as applications may vary, the positioning of the inflator may be located in other positions than those illustrated in the drawings. For example, the inflator may be located in a forward vehicle position. Thus, the presented location is provided as an example and the present invention is not intended to be limited by the same. In yet another alternative, the inflator may be remotely located and a conduit or other fluid providing means is used to supply the inflating gas from the inflator to the inflatable cushion.

Figure 2:
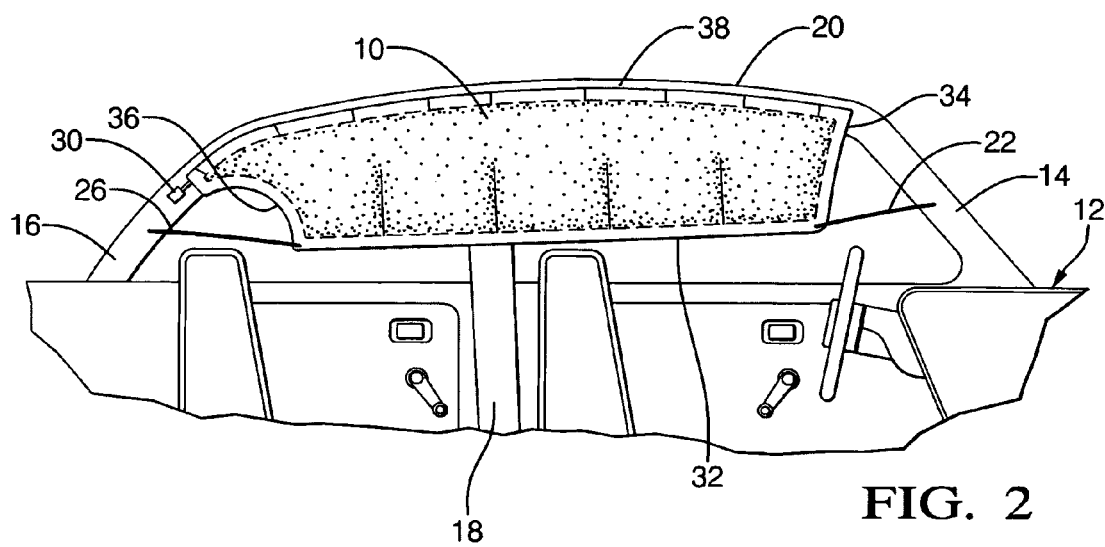
FIG. 2 is a side elevational view of an inflatable cushion in a deployed state.
Figure 3:
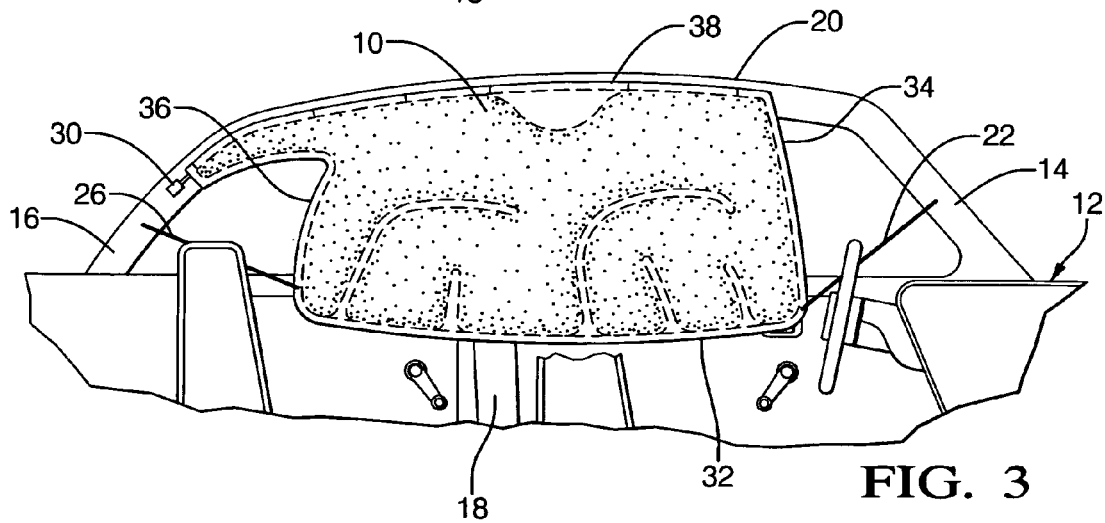
FIG. 3 is a side elevational view of an alternative inflatable cushion configuration in a deployed state.

FIGS. 2 and 3 illustrate airbag 10 in an inflated or deployed state. As illustrated in FIGS. 2 and 3 airbag 10 comprises a deploying edge 32, which comprises the bottom portion of the airbag that traverses across the window openings or window frames of the vehicle. Airbag 10 also comprises a forward edge 34, a rearward edge 36 and a fixed edge 38. Fixed edge 38 represents the portion of the airbag that remains in substantially the same position regardless of whether the airbag 10 is deployed or not.

FIGS. 2 and 3 also illustrate different types of airbags or inflatable cushion arrangements e.g., internal cavities, tethers or seams positioned to provide desired inflation characteristics or effects. It is understood that the configuration of airbag 10 may vary and the illustrations in FIGS. 2 and 3 are provided as examples and the present invention is not intended to be limited to the specific configurations provided in the figures as they are considered ancillary to the present invention. Moreover, the present invention is contemplated for use with other vehicle configurations than those illustrated in FIGS. 1-3. For example, the vehicle may be include three rows of seats such vehicles include but are not limited to sports utility vehicles, station wagons, vans or minivans. Conversely, the vehicle may comprise only a single row of seats such vehicles include but are not limited to sports coups.

During deployment the tethers or connecting means secure the inflatable cushion between the A-pillar 14 and the C-pillar 16 spanning the B-pillar 18. However, the inflatable cushion may be made to extend more rearwardly and is secured to a D-pillar of a vehicle having a longer body frame. Furthermore, the inflatable cushion may be configured for deployment only in the forward compartment of the vehicle wherein the inflatable cushion is connected to only the A-pillar and B-pillars. In an exemplary embodiment, a single inflatable cushion is configured to traverse between both the front and rear passenger compartments. Accordingly, the inflatable cushion is connected at one end to the A-pillar 14 and the C-pillar 16. It is, of course, understood that these connection points may vary with the configuration of the inflatable cushion.

The inflatable cushion may be made of any suitable air bag material for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail 24 or proximate to the roof rail as shown in FIG. 1. In order to store the airbag into the compartment the un-inflated airbag is folded into a configuration which allows it to occupy a small discrete area within the vehicle interior. In accordance with exemplary embodiments of the present invention, the inflatable cushion is folded by a machine in order to provide the configurations disclosed herein. It is also possible to fold the inflatable cushion by hand.

The tethers or connecting means are also stored in compartments of corresponding pillars 14 and 16. When a predetermined activation event or occurrence is detected, the inflatable cushion is inflated by gas from inflator 30. In general, inflator 30 will receive an inflation or deployment signal that causes inflator 30 to generate an inflation gas for inflating the inflatable cushion. In an exemplary embodiment, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

Figure 4:
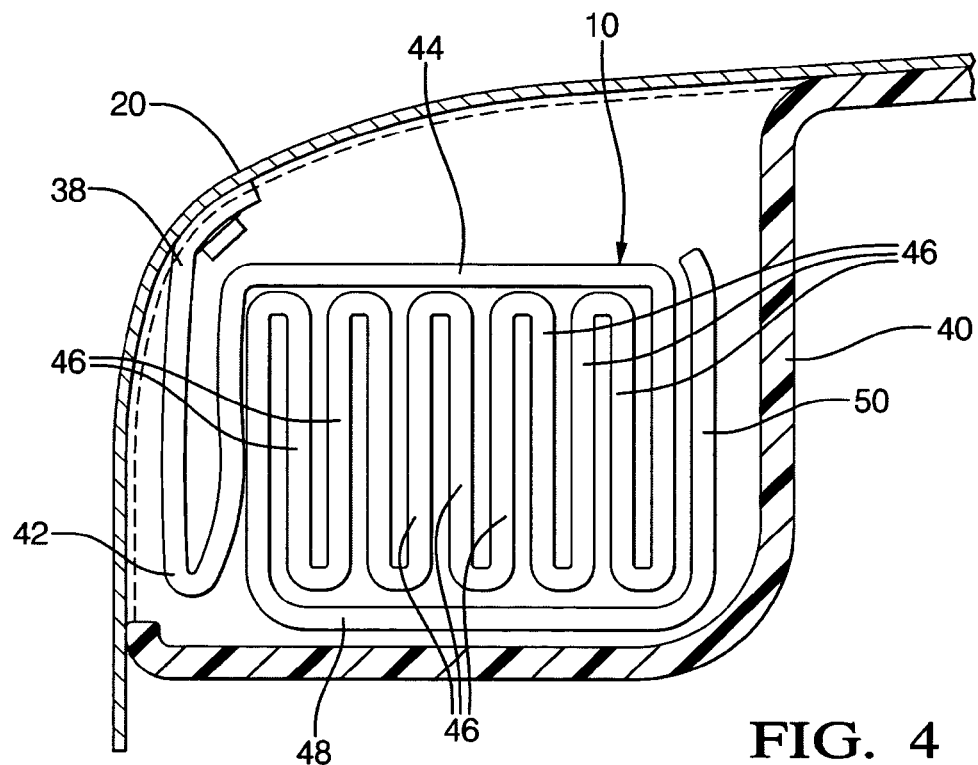
FIG. 4 is a view along lines 4-4 of FIG. 1.

Referring now to FIG. 4, a cross sectional view of airbag 10 secured in an un-inflated configuration is illustrated. In accordance with an exemplary embodiment fixed edge 38 of airbag 10 is secured to a portion of roof rail 20. In this state airbag 10 is received within an area defined by roof rail 20 and headliner 40.

In accordance with exemplary embodiments, headliner 40 comprises a portion of the interior trim of the vehicle and is configurable to be secured about airbag 10 in a detachable manner. As is known in the related arts, headline 40 provides an aesthetically pleasing appearance for the vehicle interior. In an exemplary embodiment headliner 40 is constructed out of material capable of being deflected or separated in response to the inflation pressure of airbag 10 during deployment. It is, of course, understood that headliner 40 may have other configurations and/or tear seams or grooves to facilitate movement of a portion of the headliner when the side airbag deploys. For example, headliner 40 may be configured to and a series of curves which allow the headliner to be disposed around the folded inflatable cushion when it is secured to the vehicle roof rail. Moreover, the curves may assist in the deployment of the inflatable cushion by allowing the headliner to fold at certain points defined by the curves of the headliner.

In accordance with an exemplary embodiment airbag or inflatable cushion 10 is positioned behind headliner 40 in the following configuration. First, the inflatable cushion is folded in accordance with exemplary embodiment of the present invention, which will be discussed below when referring to the cross sectional view of FIG. 4. In an exemplary embodiment, fixed edge 38 is secured to the roof rail by a plurality of bolts, screws or other adequate type of securing means. Fixed edge 32 also comprises a plurality of openings for use with the plurality of securing means for securing fixed edge 32 to the vehicle roof rail.

As illustrated in FIG. 4, the folded inflatable cushion travels downwardly from fixed edge 38 until a first fold 42 is made. Once installed in the vehicle, these portions of the inflatable cushion are located at the outboard side of the vehicle (e.g., FIG. 4). The folded cushion is then arranged to have an upper traversing portion 44 that traverses towards an inboard side of the vehicle. The traversing portion extends over one side of a plurality of folds or pleats 46 of the airbag which are folded over each other back towards the outboard side of the vehicle or towards first fold 42. At this point the cushion is then folded to have a lower traversing portion 48 that traverses back towards the inboard side of the vehicle. Finally, an end portion or belt line portion 50 corresponding to deploying edge 32 is folded over the inboard side of the folded cushion. Thus, once installed into the vehicle, end portion 50 is positioned to be the first portion of the side airbag which contacts headliner 40 and therefore end portion 50 is the first portion that travels around headliner 40 as the cushion is inflated by the inflator.

Figure 5:
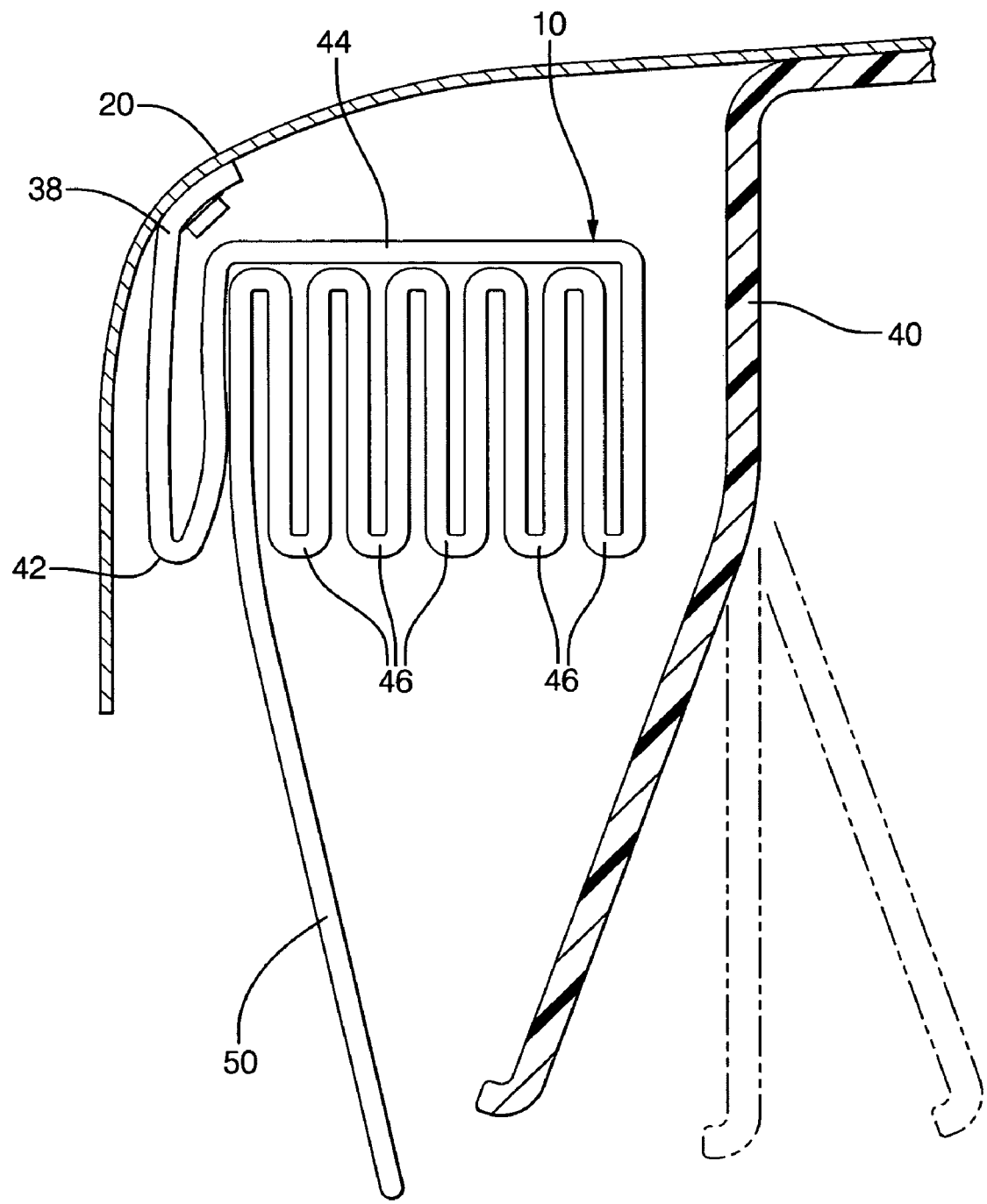
FIG. 5 is a view illustrating the partial deployment of the airbag.

It is this folding configuration that causes end portion 50 corresponding to deploying edge 32 to deploy first out of the receiving area defined by roof rail 20 and headliner 40. The initial deployment configuration is illustrated in FIG. 5 wherein a portion of inflation gas has been supplied to inflatable cushion 10 during the initial stages of inflation and end portion 50 is the first portion to deploy out of headliner 40. Then each one of the plurality of folds 46 will deploy downwardly as the inflatable cushion begins to assume the shapes illustrated in FIGS. 2 and 3. It is noted that the specific final configuration or location of end portion 50 may vary from the specific location illustrated in FIGS. 4 and 6 as long as end portion 50 contacts the headliner first during inflation and is the first portion to deploy around headliner 40.

It is understood that the inflatable cushion is folded first and then secured to the vehicle (e.g., the secured to the roof rail and securement of the inflator and connecting tethers 22 and 26). Afterwards, the headliner is secured to enclose the folded airbag in a cavity defined by the headliner and the roof rail of the vehicle.

In accordance with an alternative exemplary embodiment, a layer of plastic or other protective material (illustrated by the dashed lines in FIG. 4) may be disposed between relevant portions of airbag 10 and roof rail 20. In addition, and in accordance with yet another alternative embodiment, a plurality of retaining clips 60 may be disposed along the length of airbag 10 in order to assist in the securement of the same to the vehicle roof rail. In an exemplary embodiment, the retaining clips would depend away from the roof rail and be configured to wrap around the folded inflatable cushion. During deployment the retaining clips would bend out of the way as the cushion is inflated.

In accordance with an exemplary embodiment the time to position (TTP), e.g., time from the initial sensing of impact or deceleration, activation of inflator and inflation of the airbag having the folded configuration of FIG. 4 wherein the leading edge is positioned at the belt line or lowest deployment position of the inflated airbag is function of the inflating cushion from its housing or cavity wherein it is installed in an un-inflated state. It is, of course, understood that the various configurations of the airbag module and the vehicle in which it is installed may affect this time.

Figure 6:
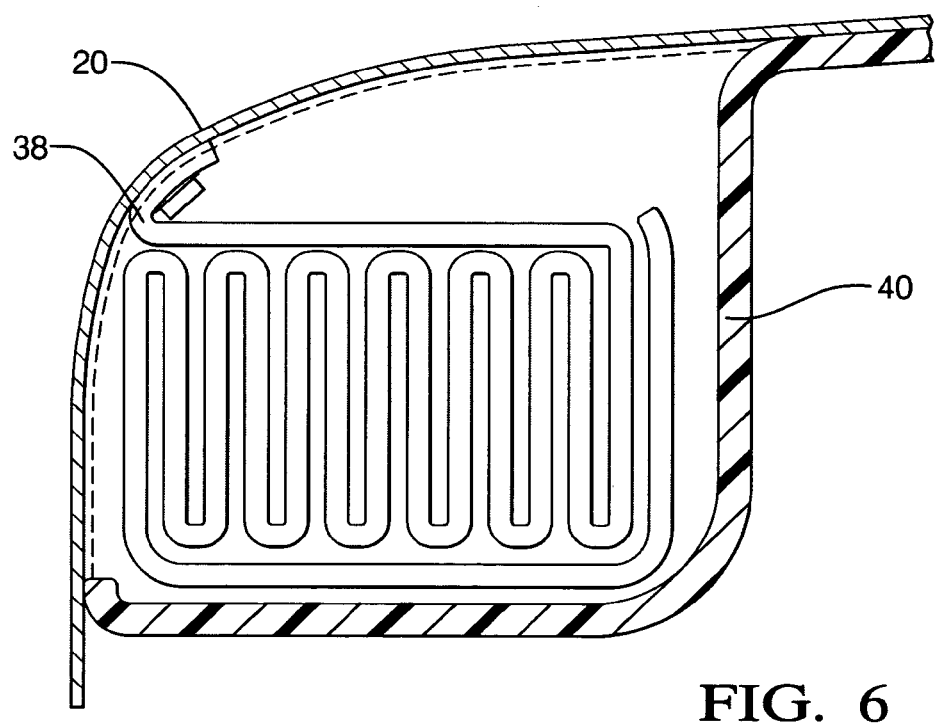
FIG. 6 is a view of an alternative exemplary embodiment of the present invention.

Referring to FIG. 6, an alternative exemplary embodiment of the present invention is illustrated. Here, fixed edge portion 38 extends directly from traversing portion 44 and first fold 42 is eliminated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method for folding an inflatable cushion of a side airbag device to form a folded inflatable cushion that includes a packet of parallel pleats comprising a first end pleat, a second end pleat and a series of middle pleats disposed therebetween, said method comprising:
   providing a securement end of said inflatable cushion;
   creating the first end pleat adjacent to said securement end, said first end pleat and said securement end defining one side of the folded inflatable cushion;
   creating a traversing portion extending from said first end pleat, said traversing portion defining another side of the folded inflatable cushion;
   creating the second end pleat extending from the traversing portion such that the first end pleat and the second end pleat are spaced apart by the traversing portion;
   creating said middle pleats extending from the second end pleat towards the first end pleat; said middle pleats including a final middle pleat adjacent to the first end pleat
   positioning an end portion extending from the final middle pleat toward the second end pleat opposite the traversing portion and disposed about the second end pleat, said end portion defining another two sides of the folded inflatable cushion, wherein said end portion is the first portion of said inflatable cushion to deploy when the inflatable cushion is inflated.

2. The method as in claim 1, wherein said securement end has a plurality of securement features for facilitating the securement of said inflatable cushion.

3. The method as in claim 1, wherein said side air bag device is installed in a vehicle having a roof rail and a headliner, wherein said inflatable cushion is folded to be received within an area defined by the roof rail and the headliner.

4. The method as in claim 3, wherein said end portion is configured to be adjacent to the headliner.

5. The method as in claim 3, wherein said traversing portion is configured to be adjacent to the roof rail.

6. The method as in claim 1, wherein said traversing portion is configured to be adjacent to the roof rail.

7. The method as in claim 1, wherein said inflatable cushion is folded by a machine.

8. A method for folding an inflatable cushion of a side airbag device to form a folded inflatable cushion that includes a packet of parallel pleats comprising a first end pleat, a second end pleat and a series of middle pleats disposed therebetween, said method comprising;

providing a securement end of said inflatable cushion;

creating a traversing portion of said inflatable cushion from said securement end, said traversing portion defining a side of the folded inflatable cushion;

creating the first end pleat extending from the traversing portion apart from the securement end;

creating said middle pleats extending from the first end pleat back towards said securement end;

creating the second end pleat extending from the middle pleats adjacent to the securement end;

positioning an end portion of said portion of said inflatable cushion extending from the second end pleat about the middle pleats opposite the traversing portions and disposed about the first end pleat, said end portion defining two sides of the folded inflatable cushion, wherein said end portion is the first portion of said inflatable cushion to deploy when the inflatable cushion is inflated.

9. The method as in claim 8, wherein said securement end has a plurality of securement features for facilitating the securement of said inflatable cushion.

10. The method as in claim 8, wherein said side air bag device is installed in a vehicle having a roof rail and a headliner, wherein said inflatable cushion is folded to be received within an area defined by the roof rail and the headliner and said end portion is configured to be adjacent to the headliner.

11. The method as in claim 10, wherein said traversing portion is configured to be adjacent to the roof rail.

* * * * *